United States Patent
Chen et al.

(10) Patent No.: US 6,807,333 B2
(45) Date of Patent: Oct. 19, 2004

(54) OPTICAL SWITCH USING AN ANNULAR ARRAY OF OPTICAL PORTS

(75) Inventors: Datong Chen, Fremont, CA (US); Julie E. Fouquet, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 183 days.

(21) Appl. No.: 10/195,592

(22) Filed: Jul. 15, 2002

(65) Prior Publication Data

US 2004/0008925 A1 Jan. 15, 2004

(51) Int. Cl.$^7$ .............................. G02B 6/35; G02B 26/08
(52) U.S. Cl. ........................................ 385/18; 385/19
(58) Field of Search ...................................... 385/16–23

(56) References Cited

U.S. PATENT DOCUMENTS

| | | | |
|---|---|---|---|
| 4,208,094 A | 6/1980 | Tomlinson, III et al. | |
| 4,470,662 A | 9/1984 | Mumzhiu | |
| 5,420,946 A | * 5/1995 | Tsai | ............................. 385/22 |
| 6,195,478 B1 | 2/2001 | Fouquet | |
| 6,222,954 B1 | 4/2001 | Riza | |

* cited by examiner

Primary Examiner—Akm Enayet Ullah
Assistant Examiner—Jerry T Rahll (57) ABSTRACT

An optical switch and method of switching provide 1×N optical switching. The optical switch comprises a plurality of optical ports arranged in an annular pattern visible to and aligned with a movable mirror. The mirror is equidistant from each port of the plurality. The optical switch having a 1-dimensional (1D) annular array of ports comprises the mirror located at a center of a circle and the 1D array disposed on a portion of a circumference of the circle. The optical switch having a 2-dimensional (2D) annular array of ports comprises the mirror located at a center of a sphere and the 2D array disposed on a portion of a surface of the sphere. The mirror is movable about one or more axes to direct an optical signal from any port to any other port of the plurality.

20 Claims, 5 Drawing Sheets

OPTICAL SWITCH USING AN ANNULAR ARRAY OF OPTICAL PORTS

TECHNICAL FIELD

The invention relates to optical signal switching. In particular, the invention relates to switches used to route signals in optical networks.

BACKGROUND ART

Optical networks are rapidly becoming the network technology of choice for modem data and telecommunications systems, principally due the inherently high bandwidth and low loss characteristics of optical fibers that carry the data from node to node within such networks. In addition to optical fibers, optical networks employ optical switches at the nodes for routing signals via a plurality of paths or circuits within the network. A current challenge in optical networking is the development of optical network switches that have performance characteristics such as bandwidth, effective bit-rate independence and/or protocol independence consistent with the characteristics of the network that employs the switch.

Figure 1A:
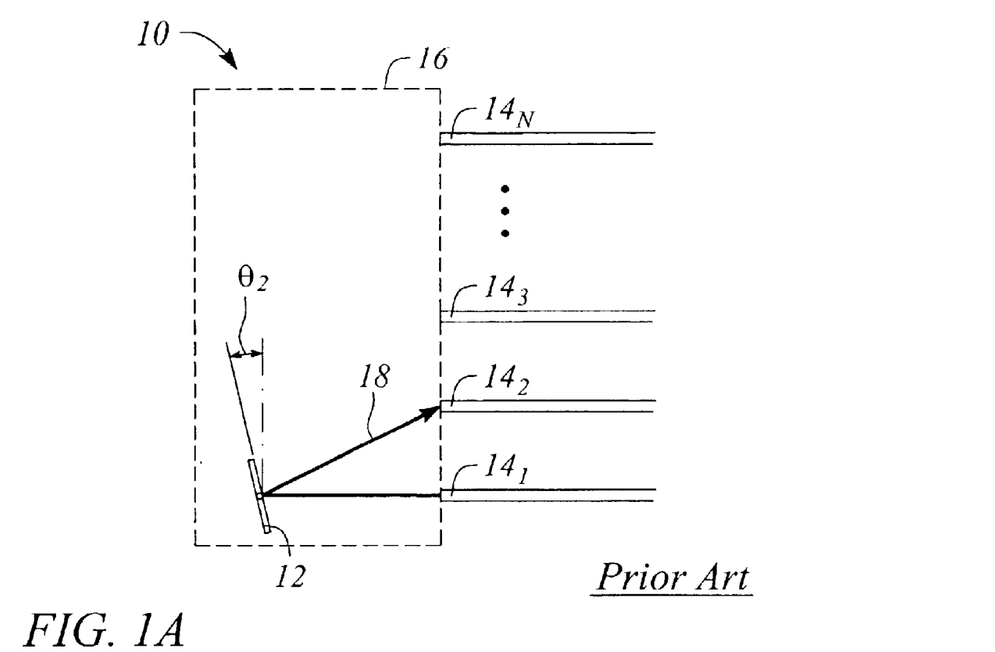
FIG. 1A illustrates a plan or top view of a conventional micro-electromechanical system (MEMS) micromirror optical switch depicting an optical beam connecting a first port and a second port.
Figure 1B:
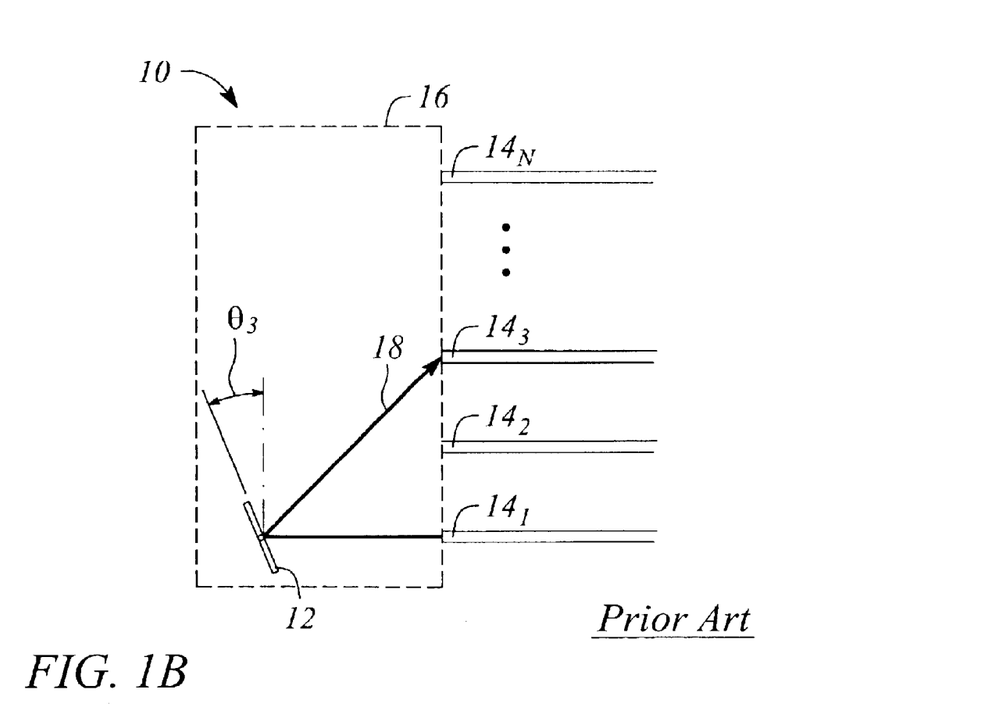
FIG. 1B illustrates a plan or top view a conventional MEMS micromirror optical switch depicting an optical beam connecting between a first port and a third port.

A relatively new approach to realizing such high performance optical switches is micro-electromechanical systems (MEMS) technology. A simplified geometry indicative of conventional MEMS micromirror optical switches known in the art is illustrated in FIGS. 1A and 1B. The optical switch 10 comprises a rotatable or movable micromirror 12 and a plurality of N optical ports $14_i$, i=1, . . . , N, rectilinearly arranged along one or more sides of a rectangle 16 surrounding the micromirror 12.

Unfortunately in switches having such geometries with the rectilinear arrangement of ports, accurate control of the orientation angle $\theta_i$ of the micromirror 12, generally necessitates the use of high precision, servo-based mirror-motion control to position the micromirror 12. In addition, the conventional rectilinear geometry produces optical path length differences with respect to various distinct port-to-port connections or switch positions of the switch. Among other things, the path length differences may cause differential defocusing of the optical beam for different switch positions.

Accordingly, it would be advantageous to have an optical switch with a geometry that yielded a more favorable trade-off between orientation angle accuracy and motion control precision. Furthermore, it would desirable for such an optical switch to have optical paths that were not different from one switch position to the next. Such an optical switch would solve a long-standing need in the area of switching for optical networks.

SUMMARY OF THE INVENTION

The present invention switches an optical signal between optical ports of an annular array of ports using a movable or rotatable mirror. The rotatable mirror is positioned substantially equidistant from each port of the annular array to direct the optical signal from an input port to an output port of the switch. The optical ports are angularly positioned in the annular array such that a minimum angular resolution of the mirror is optimized.

In an aspect of the present invention, an optical switch is provided. The optical switch comprises a plurality of optical ports arranged in an annular pattern and a rotatable mirror having a reflective surface that is adjacent to the plurality of ports. Each optical port of the plurality is equidistant from the rotatable mirror. In another aspect of the present invention, a method of switching an optical signal is provided. Certain representative embodiments of the present invention along with various features and advantages thereof are detailed hereinbelow with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 2:
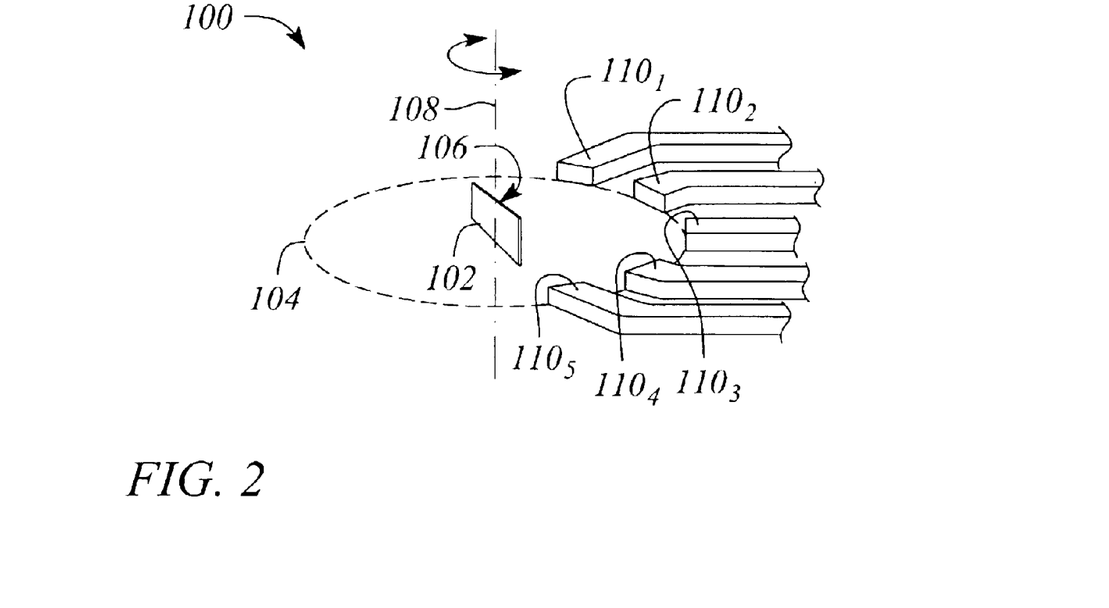
FIG. 2 illustrates a perspective view of an embodiment of an optical switch having a circular annular array of optical ports according to the present invention.
Figure 3:
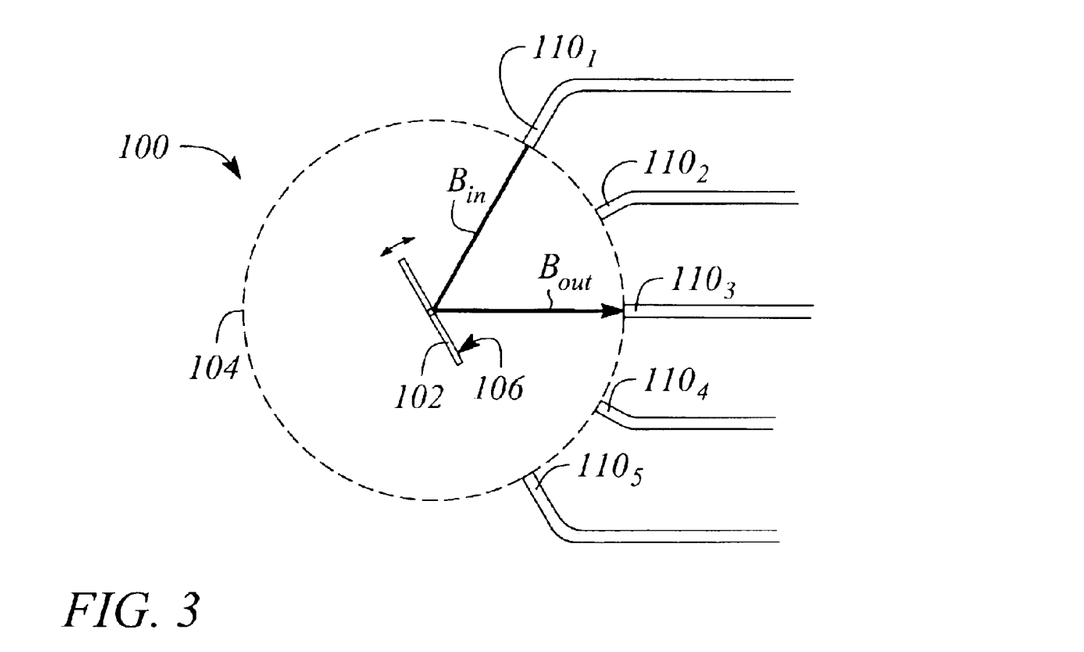
FIG. 3 illustrates a plan or top view of a geometric layout of the optical switch having a circular array of optical ports illustrated in FIG. 2.

FIG. 2 illustrates a perspective view of an embodiment of an optical switch 100 having an annular array of optical ports according to the present invention. FIG. 3 illustrates the optical switch 100 in a plan or top view. The annular array used in the optical switch 100 is a circular array. In the embodiment illustrated in FIGS. 2 and 3, the optical switch 100 may be described as a 'planar' optical switch, since all of the optical ports lie in plane defined by a circle of the circular array. Thus, circular array is effectively planar or 1-dimensional.

Figure 4:
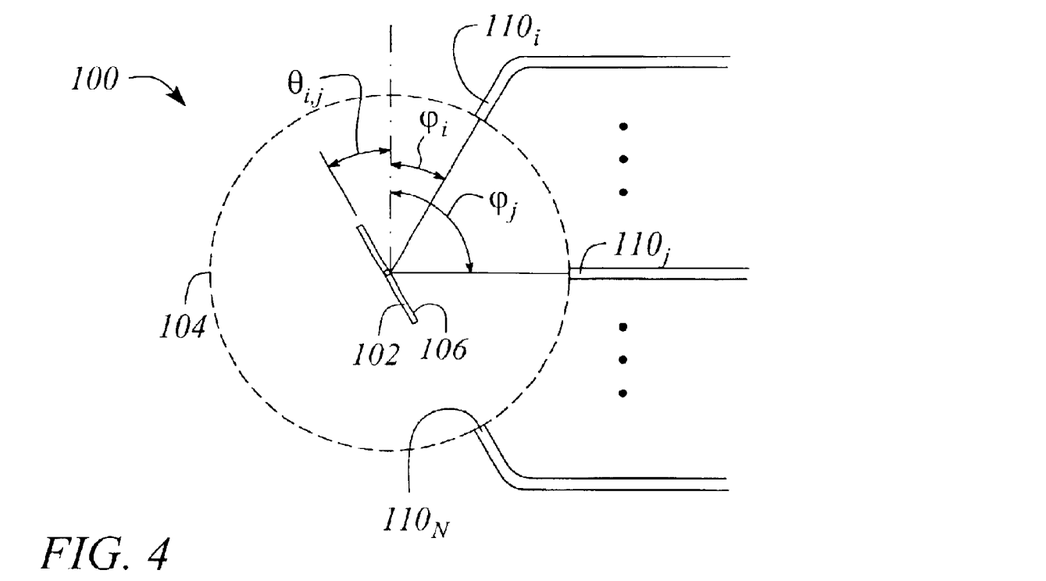
FIG. 4 illustrates a plan or top view of a relationship between angles associated with the optical switch of the present invention in FIG. 2.

The optical switch 100 comprises a movable or rotatable mirror 102 located at a center of a circle 104. The mirror 102 has a reflective surface 106 that reflects an incident optical signal or beam. The reflective mirror surface 106 is oriented perpendicular to a plane containing the circle 104. The mirror 102 may be rotated about an axis 108 passing through the center of the circle 104 and perpendicular to the plane of the circle 104. FIG. 4 illustrates an orientation angle $\theta$ of the mirror 102. The mirror orientation angle $\theta$ describes the mirror 102 rotational amount about the axis 108 from a reference position, illustrated as a dashed-dot line in FIG. 4.

In some embodiments, the mirror 102 is a micromirror fabricated using micro-electromechanical systems (MEMS) technology. A number of different movable or rotatable micromirror 102 configurations that can be fabricated using MEMS technology are applicable to the present invention. One such configuration that could be adapted for use as the mirror 102 in the optical switch 100 is disclosed by McClelland et al., U.S. Pat. No. 6,201,629 B1, incorporated herein by reference.

MEMS technology refers to fabrication of combined electrical and electromechanical devices on a single substrate using semiconductor fabrication methodologies. Thus, the MEMS micromirror 102 is a mirror fabricated as part of the semiconductor substrate or chip. The MEMS micromirror 102 is generally movably mounted to the substrate and has one or more optically reflective surfaces. Electronic or electromagnetic elements on the semiconductor chip enable the micromirror 102 to be controllably moved or positioned, thereby enabling the micromirror 102 to selectively redirect optical signals incident on the micromirror 102. The optical switch 100 of the present invention, having the MEMS micromirror 102, uses the controllable redirection of incident optical signals to selectively route signals from an input port to one or more output ports of the optical switch 100. One skilled in the art is familiar with MEMS technology and the controllability of micromirror positioning or rotation of a MEMS micromirror.

Since the MEMS micromirror 102 is based on semiconductor fabrication technology, the MEMS micromirror-based optical switch 100 may be very small and compact. In addition, the optical switch 100 has inherently low loss and is essentially bandwidth independent. Moreover, the optical switch 100 is reciprocal with respect to optical path. The term 'reciprocal', as used herein, means that the optical signal can travel as readily from output to input as it does from input to output. Thus, a 1×N optical switch is equivalent to an N×1 optical switch.

In general, a 1×N optical switch 100 according to the present invention is scalable to a large port count (i.e., N>>1) and can provide single stage switching. An N-way or 1×N optical switch is an optical switch having 1 input and N outputs, where N is an integer greater than or equal to one. Furthermore, due in part to the very low loss characteristics of the 1×N optical switch 100, an N×N optical switch 100 can be readily assembled by cascading multiple (i.e., 2N) 1×N optical switches 100 of the present invention.

The optical switch 100 further comprises a plurality of N+1 optical ports $110_i$, where i=1, . . . N+1. The optical ports $110_i$ are disposed on a 'visible portion' of a circumference of the circle 104. The optical ports $110_i$ are oriented toward the center of the circle 104 such that an optical beam produced by a port $110_i$ is directed at the mirror 102 in the center of the circle 104. The optical ports $110_i$ are angularly disposed on the circumference at angular locations corresponding to 'natural' or readily attainable orientation angles of the mirror 102. Thus, according to the present invention, the angular locations of the ports $110_i$ may be chosen to correspond to positions to which the mirror 102 may be advantageously positioned.

As used herein, the term 'visible portion' refers to a portion or a region that is visible to a reflective surface of a mirror. In particular, the visible portion of the circumference of the circle 104 is a portion of the circumference adjacent to a reflective side of the mirror 102 having a maximum angular extent. From a practical standpoint, the maximum angular extent of the visible portion effectively limits an angular separation between a pair of optical ports $110_i$, $110_j$ at opposite edges or ends of the visible portion. The present invention is not to be limited to any particular shape of the mirror 102 or any particular shape of the reflective surface 106 of the mirror 102. However for example, the visible portion with respect to a mirror 102 that is flat or has a flat reflective surface 106 is a portion of the circumference defined by a maximum angular extent of less than 90 degrees measured from a perpendicular to the mirror surface in the plane of the circle 104. Thus, a total visible portion for a flat mirror is described by a maximum angular extent that is less than 180 degrees from edge to edge (i.e., +/−90 degree with respect to the perpendicular). Furthermore for the visible portion so defined, an optical beam launched from a first optical port $110_i$ of the pair at a first end of the visible portion may be reflected by the mirror 102 to and be received by the other port $110_j$ at a second, opposite end of the visible portion. When the mirror 102 is curved or the reflective surface 106 of the mirror 102 has a curvature, such as a convex or concave surface, the optical concepts, including the visible portion for the mirror, are similarly discernible.

In practice and for certain embodiments of the optical switch 100, the visible portion may be optimized to less than the maximum angular extent to insure that an incident angle of the optical beam at the mirror 102 is not too oblique. For example, the visible portion may be defined to have an angular extent of 180 degrees minus a minimum resolution angle of the mirror 102. These optical concepts, including a visible portion for a mirror that comprises a flat or curved reflective surface, are known to one skilled in the art. Moreover, one skilled in the art can readily discern a visible portion for a given embodiment of the present invention without undue experimentation.

To better illustrate the optical switch 100 according to the present invention, consider an example of the optical switch 100 having four optical ports $110_i$ (i=1, 2, 3, or 4) and the mirror 102 that can be positioned to any one of three discrete orientation angles $\theta_k$ (k=1, 2, or 3). Furthermore, assume that a first orientation angle $\theta_1$ enables the mirror 102 to direct an optical beam incident from a first angular location at 0 degrees to a second angular location at 10 degrees on the circle 104. Moreover, assume that a second orientation angle $\theta_2$ enables the optical beam incident from the first angular location to be directed to a third angular location at 14 degrees while a third orientation angle $\theta_3$ enables the optical beam incident from the first angular location to be directed to a fourth angular location at 21 degrees on the circle 104. According to the present invention, a first optical port $110_1$ may be located at the first angular location, a second optical port $110_2$ may be located at the second angular location, a third optical port $110_3$ may be located at the third angular location, and a fourth optical port $110_4$ may be located at the fourth angular location. Then, to direct the optical beam from the first port $110_1$ to the third port $110_3$, the mirror is positioned at the second orientation angle $\theta_2$, for example. Thus, each of the 'natural' or readily attainable orientation angles $\theta_k$ of the mirror corresponds to a different input/output port combination.

In some embodiments, the ports $110_i$ are spaced in an equal angular manner along the circumference of the circle 104 at angular positions $\Phi_i$, as illustrated in FIG. 4. The term 'equal angular', as used with respect to the optical switch 100, means that an angular difference $\Delta\Phi$ between any two adjacent ports $110_i$, $110_{i+1}$ has a constant value. The optical switch 100 illustrated in FIGS. 2 and 3 is shown with five optical ports $110_1$, $110_2$, $110_3$, $110_4$, $110_5$, with equal angular port locations of $\Phi_1$=30 degrees, $\Phi_2$=60 degrees, $\Phi_3$=90 degrees, $\Phi_4$=120 degrees, and $\Phi_5$=150 degrees, respectively. Thus, the illustrated optical switch 100 of FIGS. 2 and 3 has a constant angular difference $\Delta\Phi$=30 degrees between ports $110_i$. The depiction of only five optical ports and an angular difference of 30 degrees in FIGS. 2 and 3 is for illustrative purposes only and in no way are meant to limit the number N+1 of the optical ports 110 or their relative spacing according to the present invention.

During operation of the optical switch 100, an i-th optical port $110_i$ is designated as an input port and the remaining ports $110_j$, j≠i, are designated as output ports. Any of the plurality of N+1 ports can be the i-th port $110_i$ and act as the input port. An optical signal entering the input port $110_i$ exits the port interior to the optical switch 100 as an input optical beam $B_{in}$ directed at the mirror 102. The input beam $B_{in}$ is reflected by the optically reflective surface 106 of the mirror 102 to create an output beam $B_{out}$ directed from the mirror 102 to the periphery of the circle 104. An optical path length L is defined as the length of a path followed by the combination of the input optical beam $B_{in}$ and the output optical beam $B_{out}$.

The output beam $B_{out}$ intersects the circle 104 at an angular position determined by the orientation angle θ of the mirror 102 and the angular positions $\Phi_i$ of the input port $110_i$. Snell's law for optics states that an optical beam reflects from a reflective surface with an angle that is equal to an incident angle of the optical beam. From Snell's law it is possible to determine an orientation angle of the mirror necessary to optically connect the i-th port at the angular position $\Phi_i$ to the j-th port at the angular position. The orientation angle $\theta_{i,j}$ of the mirror 102 based on Snell's law that connects the i-th port and the j-th port is given by equation (1)

$$\theta_{ij} = \frac{(\varphi_j + \varphi_i) - 180}{2} \qquad (1)$$

where all angles are in degrees and positive angles are measured clockwise from the common reference angle or position, denoted as zero degrees. The orientation angle $\theta_{i,j}$ is defined as the angle between the surface 106 of the mirror 102 and the common reference position. A negative orientation angle $\theta_{i,j}$ is interpreted an angle measured in a counterclockwise direction. FIG. 4 illustrates the relationship between the angular positions $\Phi_i$, $\Phi_j$ and orientation angle $\theta_{i,j}$ with respect to the mirror 102 and its reflective surface 106. As mentioned above, the common reference position is illustrated as a 'dashdot' line in FIG. 4. Note that, in practice, a maximum angular difference between the angular positions $\Phi_i$, $\Phi_j$ of any two ports $110_i$, $110_j$ is less than 180 degrees, according to some embodiments.

The definition given hereinabove for the orientation angle $\theta_{i,j}$ is arbitrary and is used herein for discussion purposes only. Likewise, equation (1) which follows from Snell's Law according to the aforementioned definition of the orientation angle $\theta_{i,j}$ is similarly arbitrary. In particular, one skilled in the art can readily modify equation (1) to exclude the factor '180' by redefining an origin or reference angle for the orientation angle $\theta_{i,j}$ to be normal or perpendicular to the reflective surface 106 of the mirror 102. Such a modification and all that follows from the modification are within the scope of the present invention.

As an example of applying equation (1) in conjunction with the optical switch 100 of the present invention, consider the 5-port optical switch 100 (i.e. N+1=5) illustrated in FIGS. 2 and 3. Assume that the first port $110_1$, located at an angular position of $\Phi_1$=30 degrees (from the common reference position), is the input port. Furthermore, assume that the second port $110_2$ located at an angular position of $\Phi_2$=60 degrees, the third port $110_3$ located at an angular position of $\Phi_3$=90 degrees, the fourth port $110_4$ located at an angular position of $\Phi_4$=120 degrees, and a fifth port $110_5$ located at an angular position of $\Phi_5$=150 degrees (each from the common reference position) act as output ports. To select or establish an optical connection between the first port $110_1$ and the third port $110_3$, for example, the orientation angle $\theta_{1,3}$ given by equation (1) is $$\theta_{1,3} = \frac{(30 + 90) - 180}{2} = -30 \text{ degrees.}$$

Thus, if the mirror 102 is rotated to an orientation angle $\theta_{1,3}$=−30 degrees (i.e., rotated counterclockwise 30 degrees from the reference position) an optical signal entering the optical switch 100 by way of the first port $110_1$ will exit the optical switch 100 through the third port $110_3$. Likewise, to connect the first port $110_1$ and the fifth port $110_5$, the mirror is rotated to an orientation angle of $\theta_{1,5}$=0 degrees. In this example, the optical switch 100 is reciprocal, so input and output port definitions and beam directions can be interchanged for the discussion hereinabove without altering the angles determined by equation (1).

Advantageously, the optical path lengths L are equal to a diameter of the circle 104 for all combinations of input and output ports. Since the optical path lengths are identical, the effects of differential defocusing due to path length differences are eliminated. Moreover, as noted hereinabove, ports may be disposed along the circumference of the circle 104 in an equal angular manner such that the angular difference $\Delta\Phi$ between adjacent ports is a constant value. If the angular difference $\Delta\Phi$ is a constant value, a minimum angular resolution of the orientation angle $\theta_i$ of the mirror 102 is equal to the angular difference $\Delta\Phi$. Thus, the control over mirror positioning of the optical switch 100 of the present invention is greatly simplified compared to the conventional optical switch 10.

The optical ports $110_i$ of the optical switch 100 are optical waveguides $110_i$ that carry an optical signal from an external connection on the optical switch 100 to the circumference of the circle 104. An optical signal from the optical waveguide $110_i$ entering the optical switch 100 is directed as an optical beam B toward the center of the circle 104. In some embodiments, the optical waveguides $110_i$ each has a lens or other focusing mechanism located at a respective end adjacent to the mirror 102 to collimate the beam. A collimating lens may not be necessary for some applications. Moreover, beam collimation may be accomplished by a suitable curvature of the mirror surface or a combination of a lens and a curved mirror surface 106. One skilled in the art would be able to determine if collimation is required for a given implementation of the optical switch 100 of the present invention without undue experimentation. Furthermore, one skilled can readily determine whether to use a lens, a curved mirror, or a combination thereof, to achieve a desired collimation, all of which are within the scope of the present invention.

In some embodiments, the optical waveguides $110_i$ are optical fibers. The optical fibers $110_i$ are aligned and attached to or embedded in a substrate to which the mirror 102 is rotatably attached. A collimating lens may be formed on an exit end of the optical fibers $110_i$ adjacent the mirror 102 or may be a separate element positioned between the exit end of the optical fiber $110_i$ and the mirror 102. The substrate may be a MEMS substrate and the mirror 102 may be a micromirror fabricated using MEMS technology.

A number of approaches for aligning and attaching the optical fibers $110_i$ are possible. One approach utilizes 'v-grooves' or 'u-grooves' formed in the substrate surface to align the optical fibers $110_i$. The substrate can be thought of as a fiber holder or 'fiber carrier'. An example of aligning optical fibers using a 'v-groove' is disclosed by Ohja et al., U.S. Pat. No. 6,083,843, incorporated herein by reference. Alternatively, the fibers can be mounted in a separate fiber holder that is later assembled onto a substrate that holds the mirror 102. One skilled in the art would readily determine other suitable approaches to attaching and aligning the optical fibers $110_i$. All such approaches are within the scope of the present invention.

In another embodiment of the optical switch 100, the optical waveguides $110_i$ are formed directly inside or on top of a substrate of a planar lightwave circuit (PLC). In this embodiment, the collimating lens can be formed as a separate element or can be integrated into and formed along with the optical waveguide $110_i$ of the PLC. The optical waveguides $110_i$ and other optical components of the PLC, including the lenses, if required, are formed using standard PLC and semiconductor fabrication technology.

Figure 5:
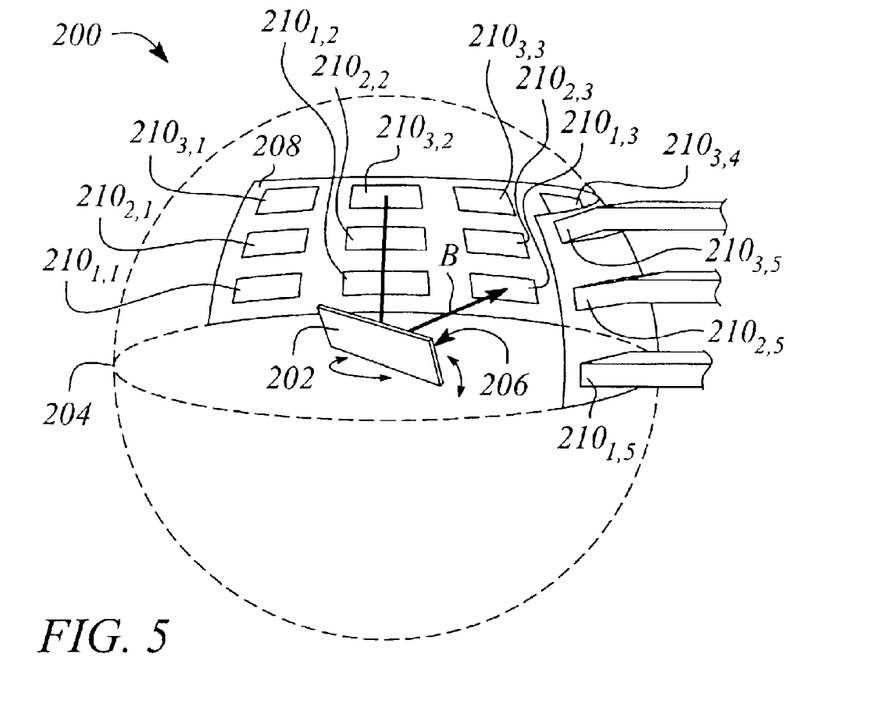
FIG. 5 illustrates a perspective view of another embodiment of an optical switch having a spherical annular array of optical ports according to the present invention.

FIG. 5 illustrates a perspective view of another embodiment of an optical switch 200 having an annular array of optical ports of the present invention. The annular array or pattern used in the optical switch 200 is a spherical array, and is at least a 2-dimensional array. The optical switch 200 comprises a mirror 202 located at a center of a sphere 204. The mirror 202 is rotatable or movable about two axes. The mirror 202 is movably mounted such that a reflective surface 206 of the mirror 202 can be tilted and/or rotated in principle, to be perpendicular to any point on a surface of the sphere 204. The combination of rotating and tilting, as used herein, is referred to as 'pointing' the mirror 202 and is illustrated in FIG. 5 as a pair of curved double-headed arrows.

In general, the mirror 202 may be pointed at a point on the surface of the sphere 204, wherein the point is perpendicular to the mirror surface 206 and is defined by a pair of angles. For example, the mirror 202 may be rotated and tilted in an 'elevation over azimuth' manner. In this case, the angles are an azimuth angle $\phi_i$ and an elevation angle $\psi_i$. Many such mirror-mounting configurations that facilitate such mirror 202 pointing are known in the art. All such mirror-mounting configurations are within the scope of the present invention. In some embodiments, the movable mirror 202 is a micromirror fabricated using MEMS technology.

The optical switch 200 further comprises a plurality of N+1 optical ports $210_i$, where i=1, ... N+1. The optical ports $210_i$ are disposed in the form of a 2-dimensional array on a portion of the surface of the sphere 204. Ideally, the mirror 202 can be pointed at any point on the surface of the sphere 204. However in practice, mechanical limitations of fabricating the mirror 202 and limitation in controlling the rotation and tilt of the mirror 202 restrict the pointing to a part or portion of the sphere 204. Nevertheless, the scope of the present invention includes both the ideal abilities and the practical abilities, since the practical limitations will diminish with technology improvements, and it is the intent of the inventors that the present invention applies to any technology improvement that overcomes a practical limitation.

For the purposes of discussion herein, the practical part of the sphere 204 to which the mirror 202 can be pointed is referred to herein as the 'visible portion' 208 of the sphere 204. The visible portion 208 of a spherical surface is an extension of the visible portion described hereinabove with respect to the circumference of a circle 104. In general, the visible portion 208 of the spherical surface is defined by both a maximum azimuth angular extent and a maximum elevational angular extent. The array of optical ports $210_i$ is located in the visible portion 208 of the sphere 204. An optical beam B emitted by an input optical port $210_i$ travels to the mirror 202 and is redirected within the visible portion 208. However, it is within the scope of the invention that the rotation and tilt of the mirror 202 are unrestricted, such that the mirror 202 ideally can be pointed to any point on the entire surface of the sphere 204.

The ports $210_i$ are disposed at angular locations on the surface of the sphere 204 within the visible portion 208. The angular locations of the ports 210 correspond to natural or readily attainable orientation angles of the mirror 202, as is described hereinabove with respect to the optical switch 100 and mirror 102. In particular, if the mirror 202 has several readily obtainable discrete orientation angles, the ports $210_i$ may be located at angular locations corresponding to the discrete orientation angles. Thus, when the mirror is positioned to a particular one of the discrete orientation angles, a particular port-to-port connection is produced. For example, for a given orientation angle of the mirror 202, a pair of ports 210 has angular locations on the surface of the sphere 204 such that an optical beam traveling from a first port of the pair to the mirror 202 is directed to a second port of the pair for the particular orientation angle. In other words, angular locations of the ports $210_i$ may be chosen to correspond to available orientation angles of the mirror 202.

Figure 6:
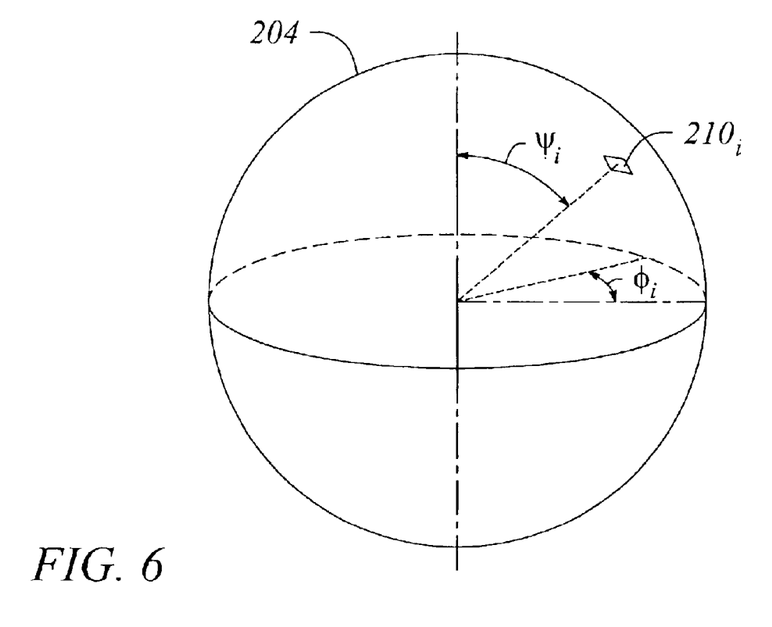
FIG. 6 illustrates a perspective view of elevation and azimuth axes with respect to the spherical array of optical ports of FIG. 5.

In an embodiment, the ports $210_i$ are spaced in an equal angular manner on the surface of the sphere 204 in the visible portion 208. FIG. 6 illustrates the locations of the ports $210_i$ that are defined by angle pairs ($\psi_i$, $\phi_i$), where $\psi_i$ is an elevation angle measured 'down' from an axis passing through a top and a bottom of the sphere 204 and $\phi_i$ is an azimuth angle measured from a second axis passing through the center of the sphere 204 perpendicular to the first axis. This is the conventional definition of elevation and azimuth with respect to a spherical coordinate system. When referring specifically to the 2-dimensional array of ports $210_i$, a pair of subscripts (j, k) are used to denote a row/column location and are substituted herein for the equivalent single subscript i to avoid confusion. Moreover, as used herein with regard to the optical switch 200, the term 'equal angular' means that an elevation angular difference $\Delta\psi$ between two adjacent ports $210_{j,k}$, $210_{j\pm1,k}$ is a first constant value and/or the azimuth angular difference $\Delta\phi$ between any two adjacent ports $210_{j,k}$, $210_{j,k\pm1}$ is a second constant value.

In some embodiments, both the azimuth angular difference $\Delta\phi$ and the elevation angular difference $\Delta\psi$ between any two adjacent ports $210_{j,k}$, $210_{j,k\pm1}$ are respective constant values. Thus, a minimum azimuth angular resolution of the mirror 202 is equal to the azimuth angular difference $\Delta\phi$ between respective adjacent optical ports $210_{j,k}$, $210_{j\pm1,k}$. Moreover, a minimum elevation angular resolution of the mirror 202 orientation angle is equal to the elevation angular difference $\Delta\psi$ between respective adjacent optical ports $210_{j,k}$, $210_{j\pm1,k}$. Advantageously, the precision of the mirror 202 position control for each mirror orientation angle may be set by or is equal to the minimum angular resolution. Moreover, a path length between an input port, the mirror 202 and an output port is a constant value equal to a diameter of the sphere 204 for all input/output port combinations and paths.

For example, the optical switch 200 illustrated in FIG. 5 depicts fifteen ports $210_{j,k}$ (j=1, ..., 3; k=1, ..., 5) arranged in an array of three rows of five ports $210_{j,k}$ each. Depending on the embodiment, the elevation angular difference $\Delta\psi$ between ports $210_{1,1}$ and $210_{2,1}$ is the same as the elevation angular difference $\Delta\psi$ between ports $210_{2,2}$ and $210_{3,2}$. Further depending on the embodiment, the azimuth angular difference $\Delta\phi$ between ports $210_{2,2}$ and $210_{2,3}$ is the same as the azimuth angular difference $\Delta\phi$ between ports $210_{1,1}$ and $210_{1,2}$ and so on. The depiction of the optical switch 200 with fifteen ports $210_{j,k}$ arranged in three rows of five illustrated in FIG. 5 is illustrative only and is not intended to limit the number or arrangement of ports $210_{j,k}$ in any way.

The optical ports $210_i$ of the optical switch 200 are optical waveguides $210_i$ that carry an optical signal from an external optical connection on the optical switch 200 to the surface of the sphere 204. The optical signal from the optical waveguides $210_i$ is directed as an optical beam B toward the center of the sphere 204. In some embodiments, the optical waveguides $210_i$ each have a lens or other focusing mechanism located at end adjacent to the mirror 202, wherein the lens collimates the beam B. A collimating lens may not be necessary for some applications. Moreover, beam collimation may be accomplished by a suitable curvature of the mirror surface 206 or a combination of a lens and a curved mirror surface 206. One skilled in the art would be able to determine if collimation is desired for a given implementation of the optical switch 200 of the present invention without undue experimentation. Furthermore, one skilled can readily determine whether to use a lens, a curved mirror, or a combination to achieve a desired collimation, all of which are within the scope of the present invention.

In an embodiment, the optical waveguides $210_i$ are optical fibers. The optical fibers $210_i$ are aligned and attached to or embedded in one or more substrates or fiber carriers. The fiber carriers are then stacked one upon another to form the array of optical ports $210_{j,k}$ with a spherical surface shape. The mirror 202 is rotatably and tiltably attached to an optical switch substrate. The fiber carriers are attached to the optical switch substrate. Alternatively, a bottom fiber carrier can be formed in the optical switch substrate and the other fiber carriers can be attached to the optical switch substrate. A collimating lens may be formed on an exit end of the optical fibers $210_i$ adjacent to the mirror 202 or may be a separate element positioned between the exit end of the optical fiber $210_i$ and the mirror 202. The optical switch substrate may be a MEMS substrate and the mirror 202 may be a micromirror fabricated using MEMS technology.

A number of approaches for aligning and attaching the optical fibers 2101 in fiber carriers are possible. One such approach utilizes 'v-grooves' or 'u-grooves' formed in the carrier surface to align the optical fibers $210_i$ as described hereinabove for the optical switch 100. One skilled in the art would readily determine other suitable approaches to attaching and aligning the optical fibers $210_i$. All such approaches are within the scope of the present invention.

In another embodiment of the optical switch 200, the optical waveguides $210_i$ are formed directly inside or on top of a substrate of a multi-layer planar lightwave circuit (PLC) with spherical spacing, as described above. In this embodiment, the collimating lens can be formed as a separate element or can be integrated into and formed along with the optical waveguide $210_i$ of the multi-layer PLC. The optical waveguides $210_i$ and other optical components of the PLC, including the lenses if desired, are formed using standard PLC and semiconductor fabrication technology.

Advantageously, the use of optical waveguides $110_i$, $210_i$ between the periphery of the circle 104 or of the sphere 204 and an outer edge of the optical switch 100, 200 facilitates changes in optical direction of an optical signal and specific locations of optical input/outputs (I/O) of the switch 100, 200. For example, the optical I/O of the switch 200 having a 2-dimensional port array can be planar instead of 2-dimensional, thereby accommodating interfacing with other circuits. Furthermore, the optical switches 100, 200 of the present invention can be cascaded to form switch configurations with more than the 1×N capability of the individual optical switches 100, 200. For example, an N×N configuration can be created from 2N of the 1×N switches 100, 200 by placing N switches 100, 200 in parallel to form N inputs.

In another aspect of the invention, a method 300 of switching an optical signal from a first optical port to a second optical port of an annular array of ports is provided. The annular array of ports is one of a circular array or a spherical array. The circular array comprises a plurality of optical ports angularly disposed on a portion of a circumference of a circle. Each of the optical ports of the circular array is oriented toward a center of the circle. The spherical array comprises optical ports angularly disposed as a 2-dimensional array on a portion of a surface of a sphere. Each of the optical ports of the spherical array is oriented toward a center of the sphere. In each case, the portion comprising the array of ports is visible to the mirror.

Figure 7:
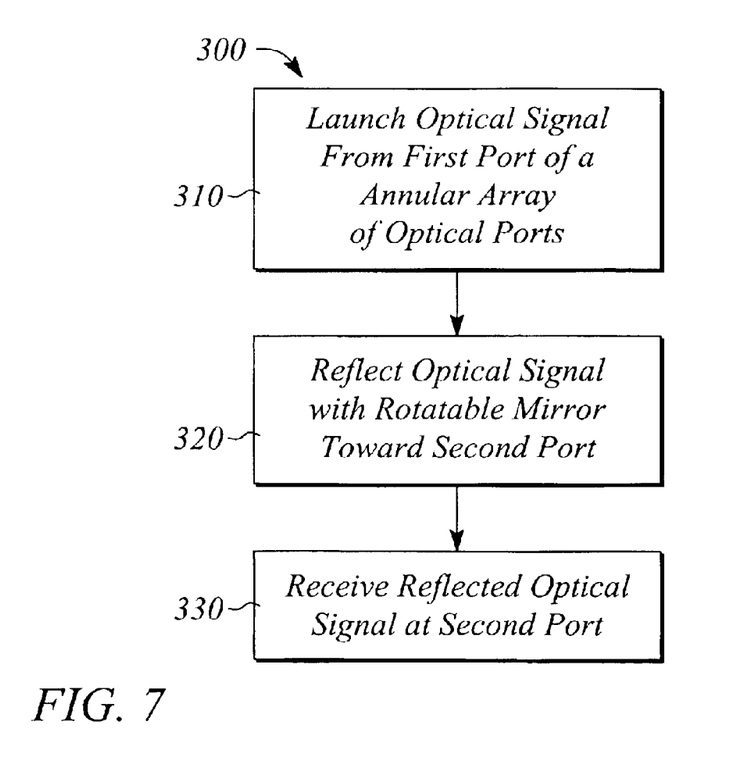
FIG. 7 illustrates a flow chart of an embodiment of a method of switching an optical signal in accordance with the present invention.

FIG. 7 illustrates a flow chart of the method 300 of switching an optical signal. The method 300 comprises launching 310 an optical signal from a first optical port of the array of ports. The optical signal may be launched 310 as an optical beam and directed towards the center of either the circle or the sphere as defined by the particular array. For example, the port may comprise an end of an optical fiber or an end of a planar lightwave circuit (PLC) waveguide, the end being oriented toward the center of the circle or of the sphere. An optical signal traveling in the fiber or waveguide toward the end is launched 310 when the end is encountered. A collimating lens may be used to focus the launched 310 optical signal into an optical beam.

The method 300 further comprises reflecting 320 the optical signal from a reflective surface of a movable or rotatable mirror that is located at the center of either the circle or the sphere, depending on the array. The mirror has an angular orientation that results in the optical signal launched thereto being reflected toward a second optical port of the annular array of ports. Typically, the mirror is positioned into the angular orientation by a mirror position controller prior to launching 310 the optical signal. However, in some cases, the mirror may be reposition into another angular orientation while reflecting 320 the optical signal.

The method 300 further comprises receiving 330 the reflected optical signal at the second optical port of the array of ports. In general, the reflected signal is received 330 by the second optical port when the reflected optical signal encounters the port. For example, if the second optical port is an end of an optical fiber or waveguide, an optical signal incident on the end of the fiber or waveguide produces a guided optical signal within the fiber or waveguide. In essence, the reflected optical signal is transformed into the guided optical signal. Thus, the reflected 320 optical signal is received 330 by the transformation into a guided signal.

Figure 8:
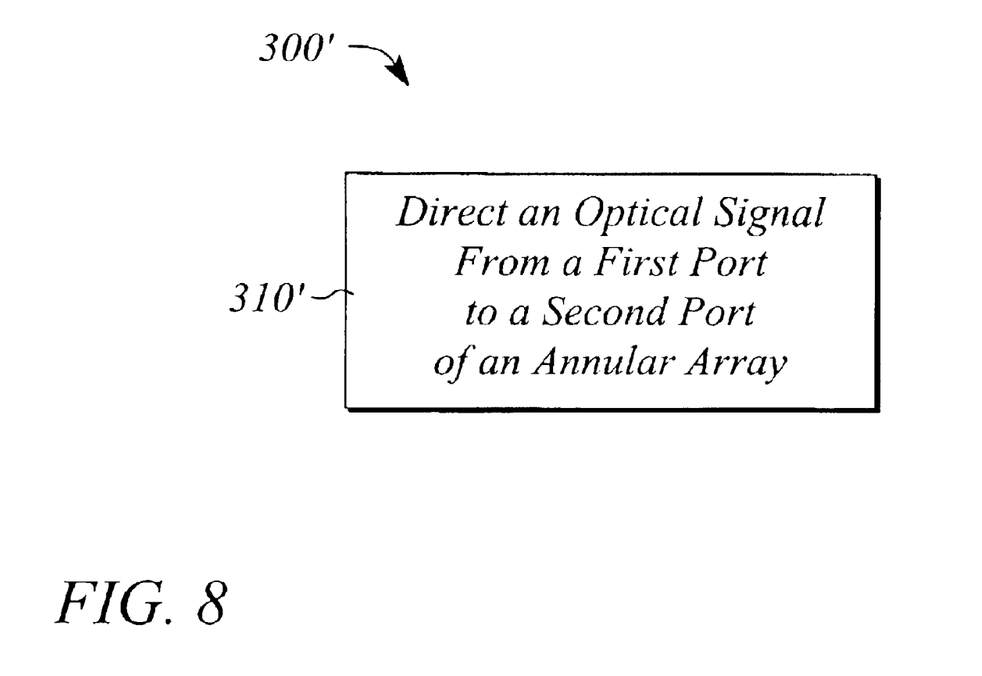
FIG. 8 illustrates a flow chart of another embodiment of a method of switching an optical signal in accordance with the present invention.

In another embodiment, the method 300' of switching an optical signal comprises directing 310' an optical signal from a first optical port to a second optical port of an annular array of optical ports with a rotatable mirror, the mirror being disposed substantially equidistant from each optical port of the annular array. Further, the annular array of ports is visible to the mirror. FIG. 8 illustrates a flow chart of the method 300' of switching. The annular array is one or both of a circular array and a spherical array. The mirror is disposed at a center of the annular array. The optical signal is directed by reflecting the optical signal as an optical beam with the mirror. Depending on the embodiment, an angular difference between any two adjacent optical ports of the annular array may be a constant value. The spherical array includes one or both of azimuthal-adjacent optical ports and elevation-adjacent optical ports. The optical signal is reflected by rotating the mirror with a controllable rotation resolution. The mirror has a minimum controllable rotation resolution. The minimum resolution is less than or equal to the constant angular difference value between adjacent optical ports. The mirror is rotated about an axis such that the mirror can be pointed to direct the optical signal to any second optical port in the circular array or to any second optical port in any column and row of the spherical array. For the spherical array, the mirror is rotated about one or both of an azimuth axis and an elevation axis to direct the optical signal to any second optical port.

Advantageously, the present invention employs orientation angles of the mirror that are readily achievable by the mirror and/or a position control of the mirror. In particular, the angular disposition of the ports on a circumference of the circle or on a surface of the sphere may be such that the port locations correspond to 'natural' or readily attainable angular orientations of the mirror. Thus, the position control of the mirror may be greatly simplified and the mirror position control precision may be reduced relative to that required by a conventional rectilinear port configuration according to the present invention.

In some embodiments, a constant angular spacing between ports is employed that may further simplify an implementation and that also helps to reduce optical signal power loss associated with inaccuracies of the mirror angular orientation. In particular, the angular differences between various angular orientations of the mirror are approximately equal to one another. Thus, a minimum resolution of the mirror may be optimized in such embodiments.

Furthermore, all optical paths from a first port to a second port have approximately equal lengths for either the circular array or the spherical array according to the present invention. An optical path is defined as a path followed by the optical signal from the first port to the mirror and on to the second port. A constant path length for all optical paths effectively eliminates differential path defocusing and provides a concomitant reduction in signal loss with respect to conventional optical switches. In addition, unlike many conventional mirror-based optical switches, any port of the optical switch of the present invention advantageously can function as the first port and any other port of the array of ports may act as the second port. Thus, the present invention facilitates redirecting or switching an input optical signal input at the first or input port to any of the other ports acting as the second or output port, provided that the first and second ports are both simultaneously within the visible portion of either the circular or spherical array.

Thus, there has been described a novel optical switch having a rotatable mirror, that reduces the required pointing precision, and that eliminates differential defocusing due path length differences compared to conventional 1×N optical switches. In addition, a method of switching an optical signal has been described. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. An optical switch comprising:
   a plurality of optical ports arranged in an annular pattern; and
   a rotatable mirror having a reflective surface that is adjacent to the plurality of ports, each optical port of the plurality being substantially equidistant from the rotatable mirror,
   wherein the plurality of optical ports includes both an input port and an output port of the optical switch.

2. The optical switch of claim 1, wherein the annular pattern of optical ports comprises a circular array, the circular array being located in a visible portion of a circumference of a circle, the optical ports being angularly spaced along the portion, the rotatable mirror being located at a center of the circle.

3. The optical switch of claim 2, wherein an angular difference between any two adjacent optical ports is a constant value.

4. The switch of claim 3, wherein the mirror is rotatable about an axis perpendicular to a plane containing the circle, a rotation of the mirror being controllable and having a rotation resolution, and wherein a minimum controllable rotation resolution of the mirror is less than or equal to the constant angular difference value.

5. The optical switch of claim 2, wherein the annular pattern comprises a plurality of the circles stacked together to approximate a spherical surface, each circle comprising an annular row of optical ports, each annular row being angularly aligned to an adjacent row in the stack to form annular columns, the circumference of each circle decreasing as a distance of each respective circle from the mirror increases.

6. The optical switch of claim 5, wherein the mirror is located at a center of the circle having a largest circumference, the mirror being rotatable about an azimuth axis and an elevation axis, such that the mirror is oriented to reflect an optical signal from any optical port in the column or the row to any other optical port in the column or the row.

7. The optical switch of claim 1, wherein the annular pattern of optical ports is a 2-dimensional array located in a visible portion of a surface of a sphere, the optical ports being angularly spaced across the portion, the rotatable mirror being located at a center of the sphere.

8. The optical switch of claim 7, wherein the annular 2-dimensional array comprises a row and a column of optical ports, each port being located by an azimuth angle and an elevation angle, the rotatable mirror being movable about at least two axes, such that the mirror is oriented to reflect an optical signal from any optical port in the column or the row to any other optical port in the column or the row.

9. The optical switch of claim 8, wherein an azimuth angular difference between azimuthal-adjacent optical ports is a constant value.

10. The optical switch of claim 9, wherein rotation of the mirror is controllable and has an azimuth rotation resolution and an elevation rotation resolution, and wherein a minimum controllable azimuth rotation resolution of the mirror is less than or equal to the constant azimuth angular difference value.

11. The optical switch of claim 9, wherein an elevation angular difference between elevation-adjacent optical ports is another constant value.

12. The optical switch of claim 11, wherein rotation of the mirror is controllable and has an azimuth rotation resolution and an elevation rotation resolution, and wherein a minimum controllable azimuth rotation resolution of the mirror is less than or equal to the constant azimuth angular difference value, a minimum controllable elevation rotation resolution of the mirror being less than or equal to the constant elevation angular difference value.

13. The optical switch of claim 8, wherein an elevation angular difference between elevation-adjacent optical ports is a constant value.

14. The optical switch of claim 13, wherein rotation of the mirror is controllable and has an azimuth rotation resolution and an elevation rotation resolution, and wherein a minimum controllable elevation rotation resolution of the mirror is less than or equal to the constant elevation angular difference value.

15. The optical switch of claim 1, wherein the optical ports of the plurality are equally angularly spaced from one another.

16. The switch of claim 1, wherein rotation of the mirror is controllable and baa a rotation resolution, and wherein a minimum controllable rotation resolution of the mirror is less than or equal to an angular spacing between optical ports.

17. The optical switch of claim 1, wherein the optical switch is fabricated using micro-electromechanical systems (MEMS) technology, the mirror being a MEMS micromirror.

18. The optical switch of claim 1, wherein the optical ports comprise optical waveguides formed as part of a planar lightwave circuit.

19. A method of switching an optical signal comprising:

launching an optical signal from a first optical port of an annular array of optical ports;

reflecting the optical signal from a reflective surface of a movable mirror, the mirror being equidistant from each optical port of the annular array; and receiving the reflected optical signal with a second optical port of the annular array of ports.

20. A method of switching an optical signal comprising:

directing an optical signal from a first optical port to a second optical port of an annular array of optical ports with a rotatable mirror, the mirror being equidistant from each optical port of the annular array, wherein the annular array is one of a circular array and a spherical array, the circular array comprising a plurality of optical ports located in a visible portion of a circumference of a circle, the spherical array comprising a plurality of columns and rows of the optical ports located in a visible portion of a surface of a sphere, the mirror being disposed at a center of the respective array.

* * * * *